(12) United States Patent
Christopher et al.

(10) Patent No.: US 11,558,845 B2
(45) Date of Patent: *Jan. 17, 2023

(54) REGISTRATION OF MULTI-PORT DEVICE

(71) Applicant: Comcast Cable Communications, LLC, Philadelphia, PA (US)

(72) Inventors: Matthew J. Christopher, Highlands Ranch, CO (US); Raghavendra P. Hegde, Wayne, PA (US)

(73) Assignee: Comcast Cable Communications, LLC., Philadelphia, PA (US)

( * ) Notice: Subject to any disclaimer, the term of this patent is extended or adjusted under 35 U.S.C. 154(b) by 2 days.

This patent is subject to a terminal disclaimer.

(21) Appl. No.: 17/221,260

(22) Filed: Apr. 2, 2021

(65) Prior Publication Data

US 2021/0258908 A1   Aug. 19, 2021

Related U.S. Application Data

(63) Continuation of application No. 16/157,794, filed on Oct. 11, 2018, now Pat. No. 10,999,812.

(51) Int. Cl.
*H04W 60/00* (2009.01)
*H04W 8/26* (2009.01)
*H04W 60/06* (2009.01)
*H04W 80/04* (2009.01)

(52) U.S. Cl.
CPC ............ *H04W 60/00* (2013.01); *H04W 8/26* (2013.01); *H04W 60/06* (2013.01); *H04W 80/04* (2013.01)

(58) Field of Classification Search
CPC ....... H04W 60/00; H04W 60/06; H04W 8/26; H04W 80/04; H04L 61/4511; H04L 61/4588; H04L 61/6022; H04L 61/304; H04L 61/1511; H04L 61/1588; H04L 65/1016; H04L 65/1006; H04L 65/1073; H04L 65/1104; H04L 2101/33; H04L 2101/622
USPC ...................................................... 455/435.1
See application file for complete search history.

(56) References Cited

U.S. PATENT DOCUMENTS

| | | |
|---|---|---|
| 2009/0034536 A1 | 2/2009 | Morand et al. |
| 2009/0092133 A1 | 4/2009 | Mok et al. |
| 2010/0040057 A1* | 2/2010 | Ko ..................... H04L 65/1073 370/392 |
| 2012/0266222 A1 | 10/2012 | Klatsky et al. |
| 2015/0382384 A1* | 12/2015 | Baek ....................... H04L 65/80 370/329 |
| 2017/0118169 A1* | 4/2017 | Boucadair ............... H04L 45/02 |

OTHER PUBLICATIONS

Garcia-Martin et al., "Diameter Session Initiation Protocol (SIP) Application", RFC 4740, Standards Track, Nov. 2006.
(Continued)

*Primary Examiner* — Michael Y Mapa
(74) *Attorney, Agent, or Firm* — Banner & Witcoff, Ltd.

(57) ABSTRACT

Systems, apparatuses, methods, and one or more computer-readable media storing executable instructions for registering a multi-port device are described. A computing device may receive a registration request from a user device supporting multiple ports. In response, the computing device may send to the user device a message including a plurality of telephone numbers and information of associated ports.

38 Claims, 13 Drawing Sheets

(56) References Cited

OTHER PUBLICATIONS

3GPP TS 24.229 V15.0.0 (Sep. 2017), 3rd Generation Partnership Project; Technical Specification Group Core Network and Terminals; IP multimedia call control protocol based on Session Initiation Protocol (SIP) and Session Description Protocol (SDP); Stage 3 (Release 15).
3GPP TS 29.228 V14.4.0 (Sep. 2017), 3rd Generation Partnership Project; Technical Specification Group Core Network and Terminals; IP Multimedia (IM) Subsystem Cx and Dx interfaces; Signalling flows and message contents (Release 15).

* cited by examiner

301

```
IMS Configuration for user A

<IMSSubscription>
    <PrivateID>MAC@homedomain.com</PrivateID>
        <ServiceProfile>
            <PublicIdentity>
                <BarringIndication>1</BarringIndication>
                <Identity> sip:TN1@homedomain.com </Identity>
                <Port> 1 </Port>
            </PublicIdentity>
            <PublicIdentity>
                <Identity> sip:TN2@homedomain.com </Identity>
                <Port> 2 </Port>
            </PublicIdentity>
            ...
            <PublicIdentity>
                <Identity> sip:TNn@homedomain.com </Identity>
                <Port> n </Port>
            </PublicIdentity>
            <InitialFilterCriteria>
                <Priority>0</Priority>
                <TriggerPoint>
                    <ConditionTypeCNF>1</ConditionTypeCNF>
                    <SPT>
                        <ConditionNegated>0</ConditionNegated>
                        <Group>0</Group>
                        <Method>INVITE</Method>
                    </SPT>
                </TriggerPoint>
                <ApplicationServer>
                    <ServerName>sip:AS1@homedomain.com</ServerName>
                    <DefaultHandling>0</DefaultHandling>
                </ApplicationServer>
            </InitialFilterCriteria>
        </ServiceProfile>
</IMSSubscription>
```

```
IMS Configuration

<IMSSubscription>
      <PrivateID>MAC@homedomain.com</PrivateID>
            <ServiceProfile>
                  <PublicIdentity>
                        <BarringIndication>1</BarringIndication>
                        <Identity> sip:MAC@homedomain.com </Identity>
                  </PublicIdentity>
                  <PublicIdentity>
                        <Identity> sip:TN1@homedomain.com </Identity>
                        <Port> 1 </Port>
                  </PublicIdentity>
                  <PublicIdentity>
                        <Identity> tel:TN1 </Identity>
                        <Port> 1 </Port>
                  </PublicIdentity>
                  <PublicIdentity>
                        <Identity> sip:TN2@homedomain.com </Identity>
                        <Port> 2 </Port>
                  </PublicIdentity>
                  <PublicIdentity>
                        <Identity> tel:TN2 </Identity>
                        <Port> 2 </Port>
                  </PublicIdentity>
                  <PublicIdentity>
                        <BarringIndication>1</BarringIndication>
                        <Identity> sip:MAC01@homedomain.com </Identity>
                  </PublicIdentity>
                  <PublicIdentity>
                        <BarringIndication>1</BarringIndication>
                        <Identity> sip:MAC02@homedomain.com </Identity>
                  </PublicIdentity>
                  <InitialFilterCriteria> ... </InitialFilterCriteria>
            </ServiceProfile>
</IMSSubscription>
```

FIG. 7B

OPTION 1

MAC_A@homedomain.com
<sip:TN1@homedomain.com;port=1>,
<sip:TN2@homedomain.com;port=2>

MAC_B@homedomain.com
sip:TN3@homedomain.com

OPTION 2

MAC@homedomain.com
<sip:TN4@homedomain.com:3001>,
<sip:TN5@homedomain.com:3002>,
<sip:TN6@homedomain.com:3003>

No TN assignment for port 4

FIG. 8

REGISTRATION OF MULTI-PORT DEVICE

CROSS-REFERENCE TO RELATED APPLICATIONS

This application is a continuation of U.S. application Ser. No. 16/157,794, filed on Oct. 11, 2018, which is hereby incorporated by reference in its entirety.

BACKGROUND

A digital voice adaptor or other devices used for voice communication via a network may have multiple ports that can be used in connection with such communication. So that those ports may be used in communication sessions, the device may perform a registration process with the network. Unlike a user device having a single port, user devices supporting multiple ports perform multiple registration processes. Performing separate registration for each port of a multi-port device may be inefficient.

SUMMARY

The following summary presents a simplified summary of certain features. The summary is not an extensive overview and is not intended to identify key or critical elements.

Systems, apparatuses, and methods are described for registering a multi-port device. A computing device in a network may receive provisioning information from a provisioning system and a registration request from a user device supporting multiple ports. The registration request may include an identifier associated with the user device, but may not include port information. The computing device may send, to the user device, a plurality of telephone numbers and information regarding ports associated with the user device. Each of the ports may be associated with one or more of the telephone numbers. The user device may store the plurality of telephone numbers and the port information, and may send another registration request message including one of the telephone numbers and its associated port number. Based on that registration request, the computing device may perform a registration for the user device with the received telephone number and other telephone numbers, thereby reducing the number of registration requests that might otherwise be needed.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIGS. 3C and 3D show example IMS configurations for one or more users.

FIG. 7B shows an example IMS configuration for a user.

FIG. 8 shows example SIP URI options for one or more users.

DETAILED DESCRIPTION

Figure 1:
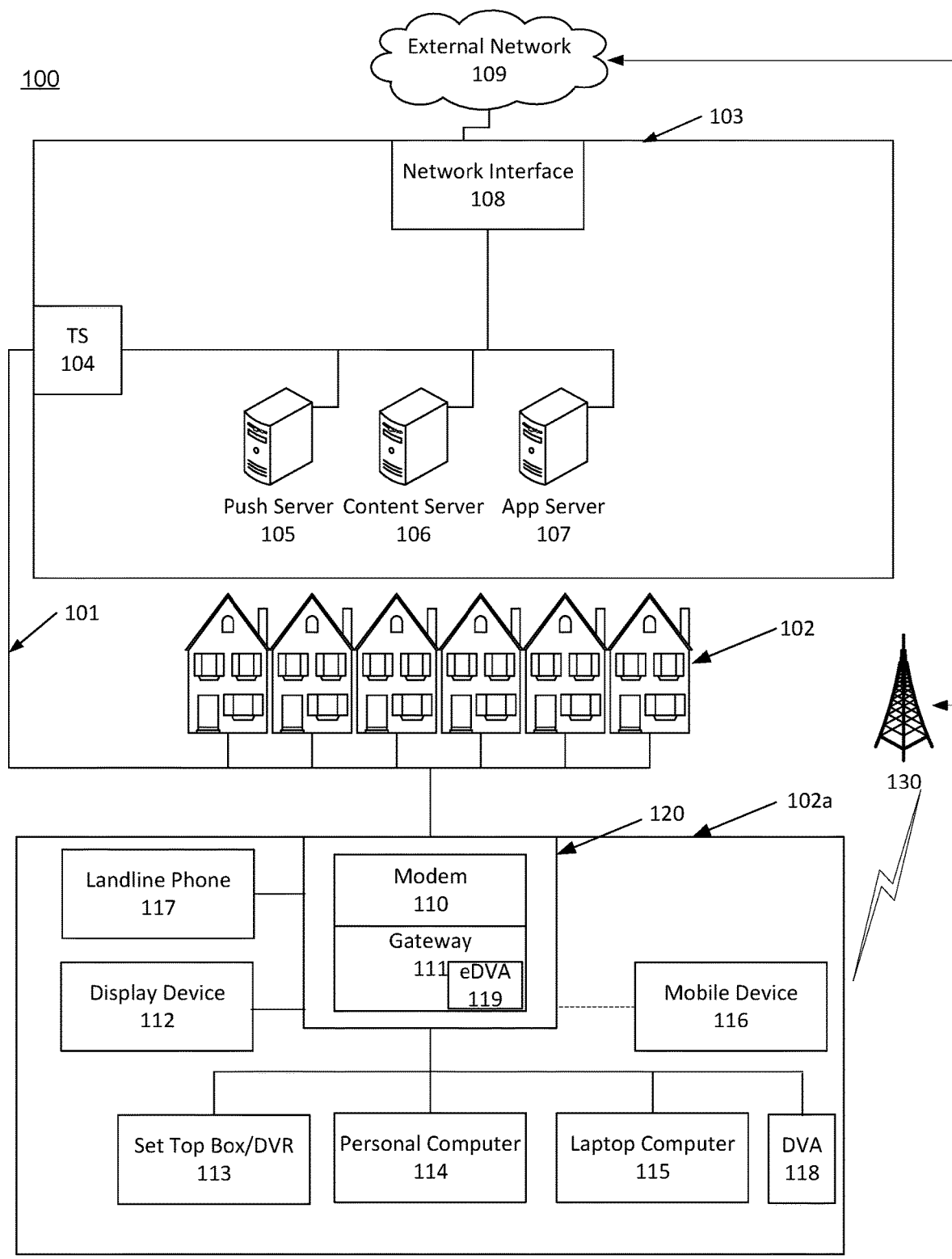
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may be any type of information distribution network, such as satellite, telephone, cellular, wireless, etc. Examples may include an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may transmit downstream information signals and receive upstream information signals via the communication links 101. Each of the premises 102 may have equipment, described below, to receive, send, and/or otherwise process those signals.

The communication links 101 may originate from the local office 103 and may be split to exchange information signals with the various premises 102. The communication links 101 may include components not illustrated, such as splitters, filters, amplifiers, etc. to help convey the signal clearly. The communication links 101 may be coupled, via the external network 109 or other networks, to an access point 130 (e.g., a base station of a cellular network, a Wi-Fi access point, etc.) configured to provide wireless communication channels to communicate with one or more mobile devices 116. The mobile devices 116 may include cellular mobile devices, and the wireless communication channels may be Wi-Fi IEEE 802.11 channels, cellular channels (e.g., LTE), and/or satellite channels. In addition to the mobile device 116, user devices located at or otherwise associated with a premises 102 may comprise, without limitation, a modem 110, a gateway 111, a display device 112, a set top box/DVR 113, a personal computer 114, a laptop computer 115, a landline phone 117, a standalone digital voice adapter (DVA) 118, an embedded DVA (eDVA) 119, and/or other devices. The DVA 118, the eDVA 119, other user devices shown in FIG. 1, and/or other types of user devices may be multi-port devices that perform operations such as are described herein.

The local office 103 may include an interface 104, such as a termination system (TS). The interface 104 may be a cable modem termination system (CMTS), which may be a computing device configured to manage communications between devices on the network of the communication links 101 and backend devices such as servers 105-107. The interface 104 may be configured to place data on one or more downstream frequencies to be received by modems at the various premises 102, and to receive upstream communications from those modems on one or more upstream frequencies.

The local office 103 may also include one or more network interfaces 108 which may permit the local office 103 to communicate with various other external networks 109. The external networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the external networks. For example, the local office 103 may also or alternatively communicate with a cellular telephone network and its corresponding mobile devices 116 (e.g., cell phones, smartphone, tablets with cellular radios, laptops communicatively coupled to cellular radios, etc.) via the interface 108. The local office 103, the external network 109 and/or the access point 130 may include a provisioning and registration system (e.g., one or more computers performing operations of an IP multimedia subsystem (IMS) and/or of a call session control function (CSCF)), or may communicate with another network including such a provisioning and registration system.

The push notification server 105 may generate push notifications to deliver data and/or commands to the various premises 102 in the network (or more specifically, to the devices in the premises 102 that are configured to detect such notifications). The content server 106 may be one or more computing devices that are configured to provide content to devices at premises. This content may be, for example, video on demand movies, television programs, songs, text listings, web pages, articles, news, images, files, etc. The content server 106 (or, alternatively, an authentication server) may include software to validate user identities and entitlements, to locate and retrieve requested content and to initiate delivery (e.g., streaming) of the content to the requesting user(s) and/or device(s). The application server 107 may be a computing device configured to offer any desired service, and may execute various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. The local office 103 may include additional servers, including additional push, content, and/or application servers, and/or other types of servers. Although shown separately, the push server 105, the content server 106, the application server 107, and/or other server(s) may be combined. The servers 105, 106, 107, and/or other servers, may be computing devices and may include memory storing data and also storing computer executable instructions that, when executed by one or more processors, cause the server(s) to perform steps described herein.

An example premise 102a may include an interface 120. The interface 120 may include any communication circuitry used to communicate via one or more of the links 101. The interface 120 may include a modem 110, which may include transmitters and receivers used to communicate via the links 101 with the local office 103. The modem 110 may be, for example, a coaxial cable modem (for coaxial cable lines of the communication links 101), a fiber interface node (for fiber optic lines of the communication links 101), twisted-pair telephone modem, cellular telephone transceiver, satellite transceiver, local Wi-Fi router or access point, or any other desired modem device. One modem is shown in FIG. 1, but a plurality of modems operating in parallel may be implemented within the interface 120. The interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway interface device 111 may comprise a set-top box (STB), digital video recorder (DVR), a digital transport adapter (DTA), an embedded Digital Voice Adaptor (eDVA) 119, an embedded Media Terminal Adaptor (eMTA), a computer server, and/or any other desired computing device. The gateway interface device 111 may also include local network interfaces to provide communication signals to requesting entities/devices in the premises 102a, such as display devices 112 (e.g., televisions), additional STBs or DVRs 113, personal computers 114, laptop computers 115, mobile devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

One or more of the devices at a premise 102a may be configured to provide wireless communications channels (e.g., IEEE 802.11 channels) to communicate with a mobile device 116. The modem 110 (e.g., access point) or the mobile device 116 (e.g., router, tablet, laptop, etc.) may wirelessly communicate with one or more other mobile devices, which may be on- or off-premises.

The mobile device 116 may communicate with a local office 103 including, for example, with the servers 105, 106, and 107. The mobile device 116 may also be wearable devices (e.g., a smart watch, electronic eye-glasses, etc.), or any other mobile computing devices. The mobile device 116 may store, output, and/or otherwise use assets. An asset may be a video, a game, one or more images, software, audio, text, webpage(s), and/or other content. The mobile device 116 may include Wi-Fi transceivers, cellular transceivers, satellite transceivers, and/or global positioning system (GPS) components.

Figure 2:
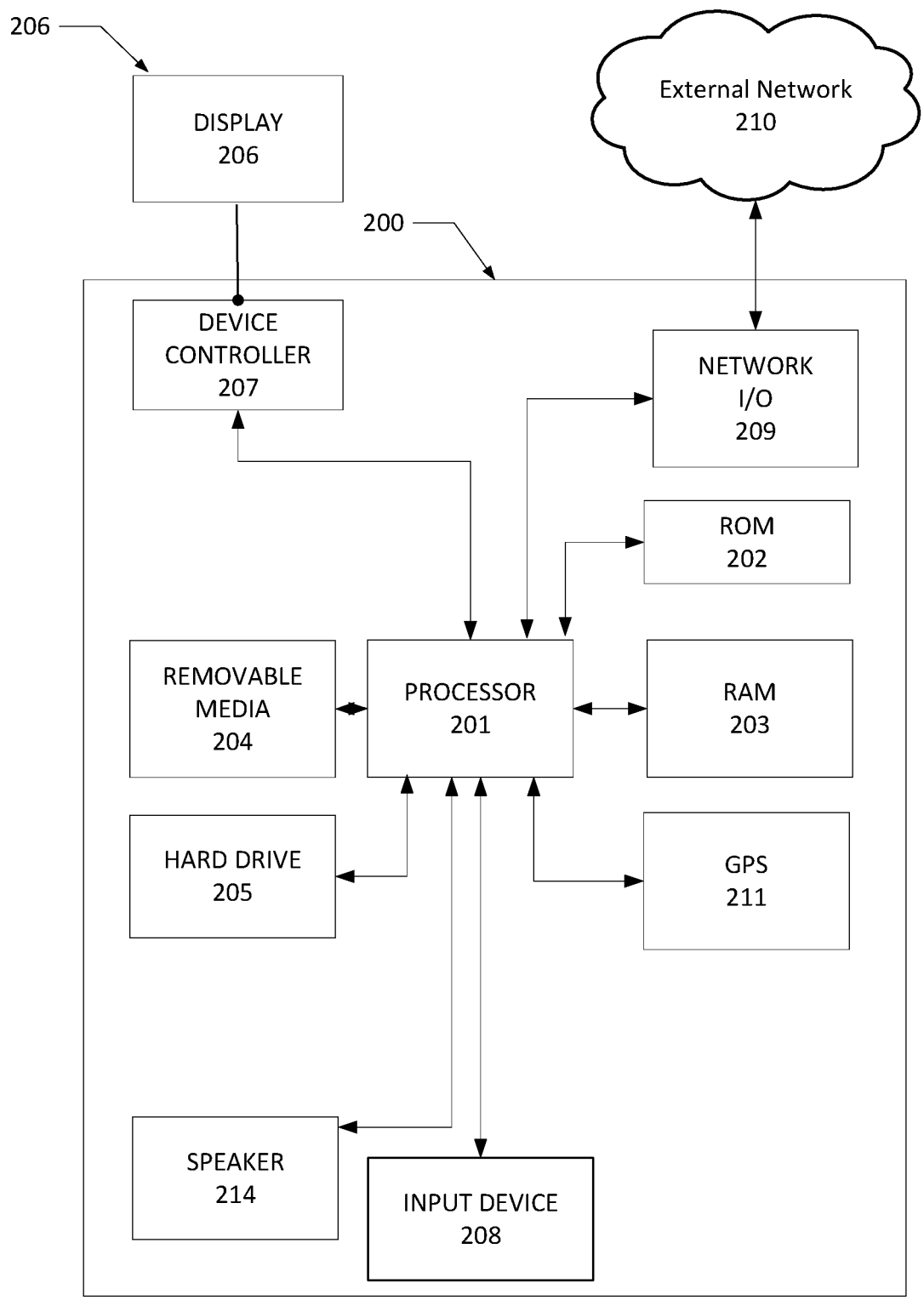
FIG. 2 shows hardware elements of a computing device.

FIG. 2 shows hardware elements of a computing device that may be used to implement any of the computing devices discussed herein (e.g., a user device, a computing device, etc. that may perform the processes and/or operations described herein). The computing device 200 may include one or more processors 201, which may execute instructions of a computer program to perform any of the functions described herein. The instructions may be stored in a read-only memory (ROM) 202, random access memory (RAM) 203, removable media 204 (e.g., a Universal Serial Bus (USB) drive, a compact disk (CD), a digital versatile disk (DVD)), and/or in any other type of computer-readable medium or memory. Instructions may also be stored in an attached (or internal) hard drive 205 or other types of storage media. The computing device 200 may include one or more output devices, such as a display 206 (e.g., an external television or other display device), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. The network input/output circuit 209 may include a modem (e.g., a cable modem), and the external network 210 may include the communication links 101 discussed above, the external network 109, an in-home network, a network provider's wireless, coaxial, fiber, or hybrid fiber/coaxial distribution system (e.g., a DOCSIS network), or any other desired network. Additionally, the computing device 200 may include a location-detecting device, such as a global positioning system (GPS) microprocessor 211, which can be configured to receive and process global positioning signals and determine, with possible assistance from an external server and antenna, a geographic position of the computing device 200. The computing device 200, may comprise an eMTA, eDVA, or other embedded devices, or may comprise a DVA, and MTA or other device communicating via another computing device 200. The computing device 200, or a combination of computing devices 200, may perform one or more operations of a CSCF, one or more operations of an IMS-home subscriber server (HSS), one or more operations of a provisioning system, and/or one or more other operations described herein.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3A:
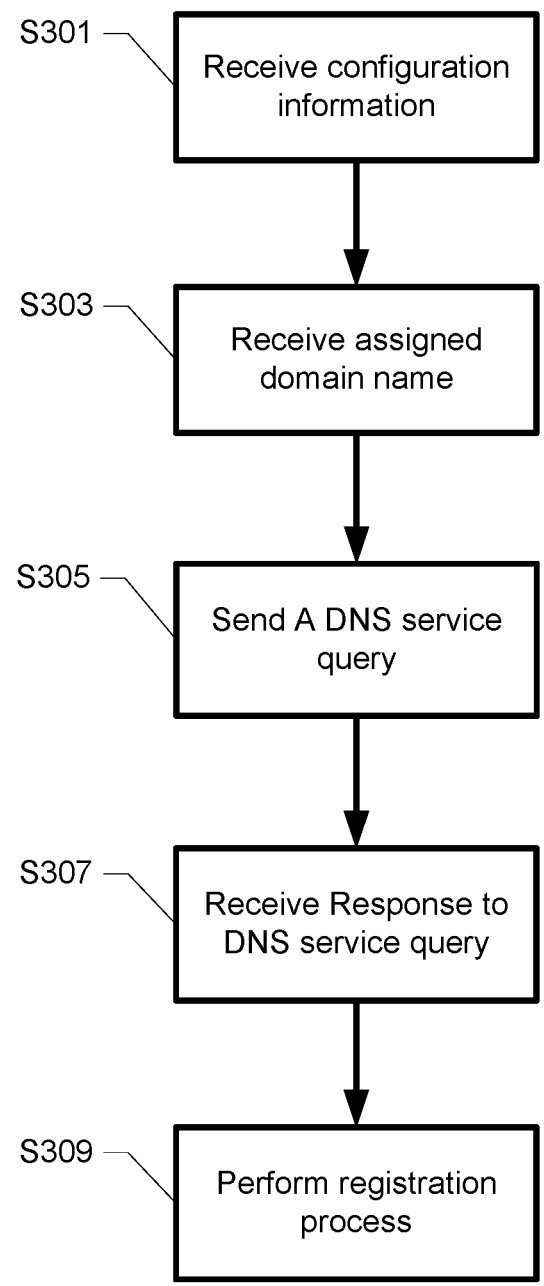
FIG. 3A is a flow chart showing an example method for providing configuration information.

FIG. 3A is a flow chart showing an example method for configuring a multi-port user device. The method of FIG. 3A may be performed by a multi-port eDVA such as the eDVA 119, by a multi-port standalone DVA such as the DVA 118, and/or by other multi-port user devices. In step S301, the user device may receive configuration information. The configuration information may be received from a host of an IMS service or from one or more other computing devices in a network (e.g., a network comprising a CSCF). In step S303, the user device may receive an assigned domain name that is a domain name of the host of an IMS service (or an IP address of the host). The assigned domain name may be received from the host of the IMS service or a separate domain name service (DNS) server. The domain name may be assigned during a first booting process of the user device or at some other time.

In step S305, the user device may send a DNS service query (to e.g., the host of the IMS service or the DNS server) based on the assigned domain name. The DNS service query may be used to identify one or more hosts on which a service is being hosted in a domain. In step S307, the user device may receive a response to the DNS service query. The response may be received from the host of the IMS service, the DNS server, or another device in a network for a call registration service. The response may include an IP address of a network node (e.g., an IMS-CSCF system including a Proxy-CSCF (P-CSCF) node) that the user device will attempt to register with. Alternatively, or additionally, the address of the network node may be configured during initial provisioning or via a 3GPP IMS management object. In step S309, the user device may perform a registration process with the CSCF system. Examples of methods for registration are described below in connection with FIGS. 4-7.

The CSCF system (e.g., an IMS-CSCF 420 in FIG. 4) may include a P-CSCF, an Interrogating-CSCF (I-CSCF), and a Serving-CSCF (S-CSCF). The P-CSCF may be a SIP proxy and may be the first contact point in the CSCF by the user device. The P-CSCF may provide a user-network interface that protects the IMS network and the user device. The P-CSCF may inspect all the signals between the user device and the IMS-CSCF system. The P-CSCF may compress and decompress SIP messages communicated with the user device. The I-CSCF, the address of which may be provided by the DNS server or another network device, may provide other SIP functions. For example, the I-CSCF may query the HSS to retrieve the address of the S-CSCF and assign it to the user device for a SIP registration. The I-CSCF may forward SIP requests or responses to the S-CSCF. The S-CSCF may be a SIP server and may perform session control. The S-CSCF may access the HSS to receive and store user profiles including a user profile of the user device. Other functions of P-CSCF, I-CSCF, and S-CSCF of various mobile networks and other communication networks may be implemented in the CSCF system as well. Operations of each of the P-CSCF, the I-CSCF, the S-CSCF, and of other elements described herein may be performed by one or more computing devices. A single computing device may perform operations of multiple CSCF and/or other elements described herein.

Figure 3B:
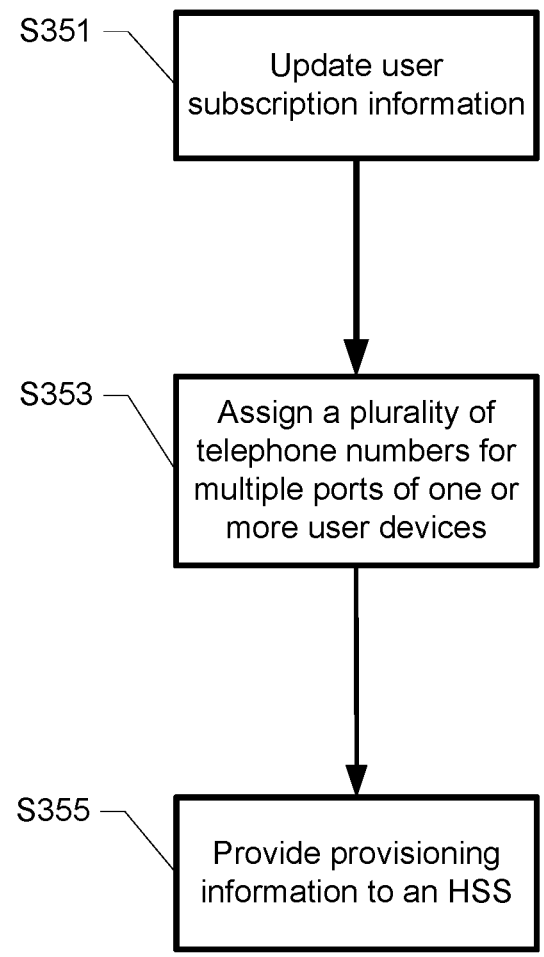
FIG. 3B is a flow chart showing an example method for performing provisioning.

FIG. 3B is a flow chart showing an example method for provisioning. In step S351, a computing device may update subscription information and may perform user provisioning with an HSS (e.g., the IMS-HSS 430 shown in FIG. 4). The computing device may be an HSS system. The computing device may be a separate provisioning server configured to communicate with an HSS system. Based on a user profile of the user, the computing device may determine one or more user devices associated with the user and update information of the user devices. For example, the user profile may indicate that the user has a first user device supporting two ports and a second device supporting a single port. As another example, the user profile may indicate that the user has one user device supporting four ports. The computing device may determine, based on the user profile, a plurality of telephone numbers to be provisioned to the one or more user devices.

In step S353, the computing device may assign a plurality of telephone numbers for multiple ports of one or more user devices. For example, the computing device may assign three telephone numbers for the user based on a user profile. If the user has a first user device supporting two ports and a second device supporting a single port, two of the three telephone numbers may be respectively assigned to the two ports of the first user device and the remaining telephone number may be assigned to the single port of the second user deice. If the user has one user device supporting four ports, the three telephone numbers may be respectively assigned to three ports of the user device. The remaining port may not be provisioned with a telephone number (or may be provisioned with one of the three telephone numbers so that the remaining port may share the same telephone number with another port). In step S355, the computing device may store a user provisioning configuration in an HSS. For example, the user provisioning configuration may include an IMS configuration for one or more users.

FIG. 3C shows an example of IMS configuration data 301 for one or more users (e.g., a user A) that may be stored by an IMS-HSS and/or by other elements described herein, and that may be provided to an IMS-CSCF during registration. The IMS configuration for a user may include one or more identifiers (e.g., a private identity and a plurality of public identities associated with the private identity). The user profile of the user may indicate a user device to be registered for the user. A device identity of the user device may be used as the private identity of the user. The device identity may be a MAC-based ID that is based on a Media Access Control (MAC) address associated with the user device. An example private identity for a user may be a MAC-based private identity (e.g., MAC@homedomain.com) that includes a MAC address (e.g., MAC) of the user device and an assigned domain name (e.g., homedomain.com). The IMS-HSS may store the private identity associated with private ID syntax tags. For example, the IMS configuration for the user may include "<PrivateID> MAC@homedomain.com </PrivateID>." The MAC-based private identity for the user may be identified by using an opening private ID syntax tag "<PrivateID>" and a closing private ID syntax tag "</PrivateID>." An IP multimedia private identity (IMPI) may be an example of a private identity.

The IMS configuration data 301 for the user may also include data indicating a plurality of available ports for a user device. A computing device (e.g., the provisioning system 440 in FIG. 4) may determine, based on a user profile in the IMS subscription, whether the user device supports more than one port. If the user device supports more than one port, the computing device may respectively associate a plurality of ports supported by the user device with a plurality of telephone numbers. For example, as public identities associated with the private identity of the user, the computing device may determine a plurality of telephone numbers (TNs) including a telephone number 1 (TN1) and a telephone number 2 (TN2). The computing device may associate the TN1 with a port 1 of the user device and associate the TN2 with a port 2 of the user device. An IP multimedia public identity (IMPU) may be an example of a public identity.

A public identity for a user may include one of the TNs and the associated domain name (e.g., TN1@homedomain.com). The IMS-HSS may store the public identity with public ID syntax tags (e.g., <PublicIdentity> and </PublicIdentity>). A plurality of public identities (e.g., TNs) for the user device may be associated with a plurality of ports of the user device. For example, in order to associate a TN with a port, public ID syntax tags for one public identity may include ID syntax tags (e.g., <Identity> and </Identity>) and port syntax tags (<Port> and </Port>). For example, for a first public identity associated with a port 1, FIG. 3C shows that the IMS configuration data 301 for the user may include "<PublicIdentity> <Identity> sip: TN1@homedomain.com </Identity> <Port>1</Port> </PublicIdentity>." For a second public identity associated with a port 2, the IMS configuration data 301 for the user may include "<PublicIdentity> <Identity> sip: TN2@homedomain.com </Identity> <Port>2</Port> </PublicIdentity>." The IMS-HSS may store the plurality of public identities for the user in association with the private identity. For example, FIG. 3C shows that the plurality of public identities for the user may follow the private identity. Each of the public identities may be generated based on the Session Initiation Protocol (SIP). For example, a first public identity for the user may include "sip: TN1@homedomain.com."

Service profile syntax tags (<ServiceProfile> and </ServiceProfile>) may follow the private ID syntax tags. The service profile associated with the service profile syntax tags may define the plurality of public identities associated with the private identity. The service profile may also include barring indication information indicated by barring indication syntax tags (<BarringIndication> and </BarringIndication>) and a Boolean type value included between the barring indication syntax tags. The Boolean type value (a value of "1" indicates TRUE and a value of "0" indicates FALSE) may be set to indicate whether a barring indication is to be applied. If the value of the barring indication is set to one, the S-CSCF may prevent that corresponding public identity from being used in any IMS communication except registrations and de-registrations. If the barring indication information is not present, it may be assumed that the Boolean type value is set as false.

Initial filter criteria class associated with initial filter criteria syntax tags (<InitialFilterCriteria> and </InitialFilterCriteria>) may include zero or one instance of a trigger point class and one instance of an application server class. A priority class may include priority syntax tags (<Priority> and </Priority>) and a numerical value indicating the priority of the filter criteria. For example, a filter criteria with a higher value of the numerical value in a priority class may be assessed after a filter criteria with a lower value of the numerical value in another priority class. The trigger point class associated with trigger point syntax tags (<TriggerPoint> and </TriggerPoint>) may describe the trigger points that should be checked in order to find out if the indicated application server should be contacted or not. Each trigger point may include a condition type CNF field having a Boolean type value to indicate conjunctive or disjunctive normal form (CNF for value "1" or DNF for value "0"). Each trigger point may include one or more service point trigger (SPT) classes identified by SPT syntax tags (<SPT> and </SPT>). A condition negated field associated with condition negated syntax tags (<ConditionNegated> and </ConditionNegated>) may define whether the individual SPT is negated. The SPT class may include a group field associated with group syntax tags (<Group> and </Group>) and a method field associated method syntax tags (<Method> and </Method>). The method field may indicate a method type, e.g., "INVITE," "MESSAGE,", and "SUBSCRIBE."

Figure 3D:
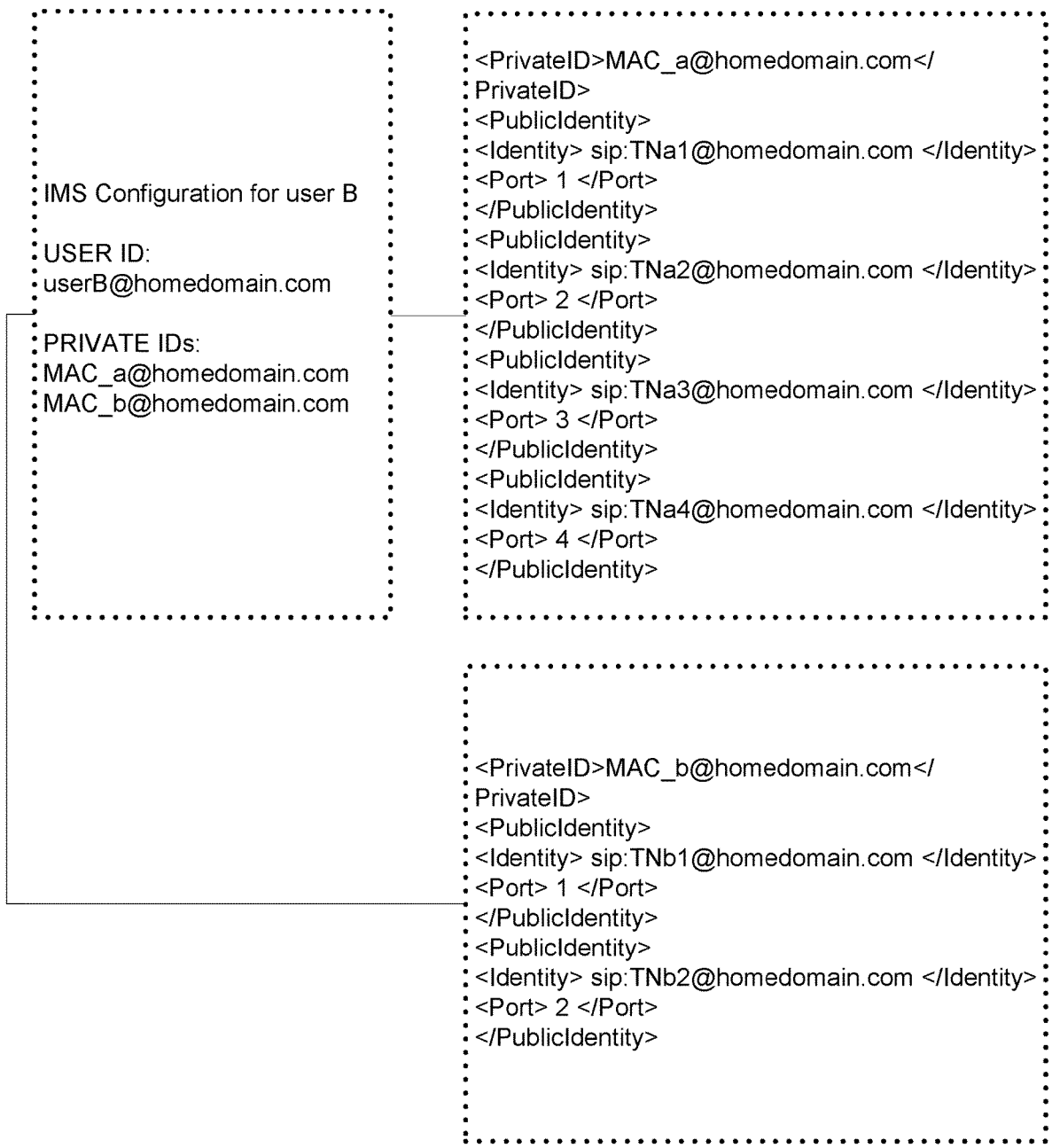

FIG. 3D shows another example IMS configuration 302 for one or more users (e.g., a user B) that may be stored by an IMS-HSS and/or by other elements described herein, and that may be provided to an IMS-CSCF during provisioning. The IMS configuration data 302 for a user may include a user identity (USER ID) and one or more private identities (e.g., MAC-based IDs) associated with the user identity. The user profile of the user may indicate more than one user device to be registered for the user, and a user identity (e.g., a username, a user account, etc.) associated with a plurality of user devices may be used as the user identity of the user. For example, the user identity for the user B may be "userB@homedomain.com." Instead of using the domain name (e.g., homedomain.com shown in FIG. 3C), an IP address (e.g., IPv4 or IPv6) may be used to indicate a host of an IMS service. Similar to the IMS configuration shown in FIG. 3C, the IMS-HSS may store the private identity associated with private ID syntax tags.

A plurality of private identities (e.g., MAC-based identities that include MAC addresses of the user devices) may be under the user identity "userB@homedomain.com." Similar to the IMS configuration 301 shown in FIG. 3C, the IMS configuration data 302 may also include a plurality of public identities associated with a plurality of available ports for a user device. In FIG. 3D, each of the user devices is associated with a MAC address. For example, a first device associated with MAC address "MAC_a" has a MAC-based identity "MAC_a@homedomain.com," and a second device associated with MAC address "MAC_b" has a MAC-based identity "MAC_b@homedomain.com." A plurality of public identities and their associated ports may be associated with a private identity. For example, the first device (MAC_a@homedomain.com) has four public identities (sip:TNa1@homedomain.com, sip:TNa2@homedomain.com, sip:TNa3@homedomain.com, and sip:TNa4@homedomain.com) and four associated ports (1, 2, 3, and 4), and the second device (MAC_b@homedomain.com) has two public identities (sip:TNb1@homedomain.com and sip:TNb2@homedomain.com) and two associated ports (1 and 2). The IMS-HSS may store the private identity associated with private ID syntax tags. For example, the IMS-HSS may store the MAC-based identities associated with private ID syntax tags. For example, the IMS configuration for the user may include "<PrivateID> MAC_a@homedomain.com </PrivateID>" and "<PrivateID> MAC_b@homedomain.com </PrivateID>". The MAC-based identity for the user may be identified by using an opening private ID syntax tag "<PrivateID>" and a closing Private ID syntax tag "</PrivateID>." The syntaxes for the public identities and ports may be the same or similar to those described above with respect to the IMS configuration data 301 (FIG. 3C).

Figure 4:
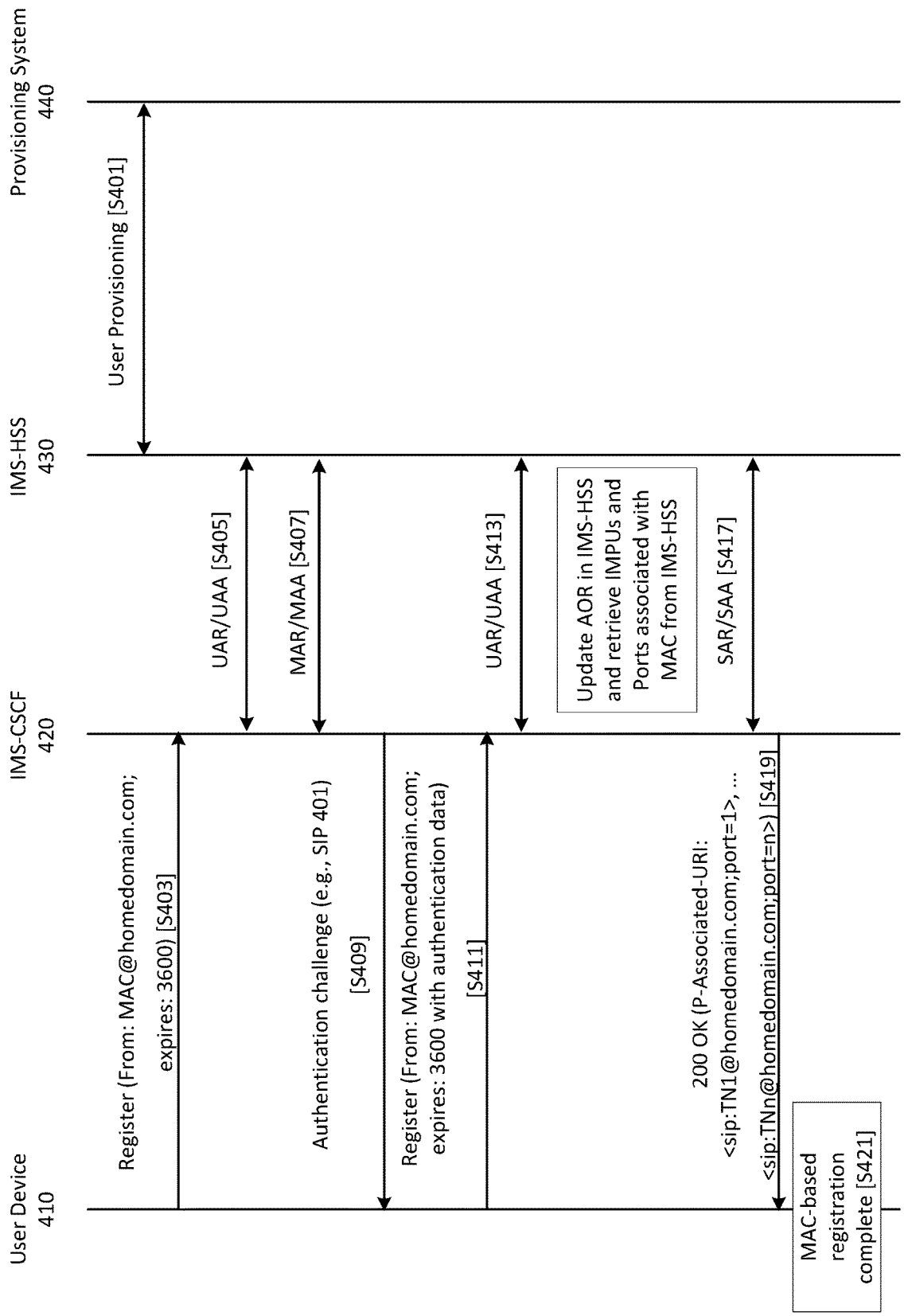
FIG. 4 is a message flow chart showing an example method for performing a MAC-based registration for a user device.

FIG. 4 is a message flow chart showing an example method for performing a MAC-based registration for a user device 410. In FIGS. 4-7, reference numbers for steps are indicated with square brackets ("[ ]") for clarity. The user device 410 may be one of the user devices described above or another user device. For convenience, FIGS. 4-7 are discussed based on an example of a multi-port user device registering using IMS configuration data 301. The user device 410 may communicate with an IMS-CSCF 420. The IMS-CSCF 420 may be the CSCF system described above and may comprise one or more computing devices that perform operations of a P-CSCF, an I-CSCF, an S-CSCF, and/or other IMS elements. The IMS-CSCF 420 may communicate with an IMS-HSS 430. The IMS-HSS 430 may comprise one or more computing devices performing operations of the IMS-HSS 430. A single computing device may perform operations of some of all of the IMS-CSCF 420 and of the IMS-HSS 430, or operations of the IMS-HSS 430 may be performed by a separate computing device. In step S401, a provisioning system 440 may perform a user provisioning with the IMS-HSS 430. In particular, and as described above with respect to FIGS. 3B through 3D, the IMS-HSS 430 may store IMS configuration for one or more user devices (e.g., the user device 410) received from the provisioning system 440. The provisioning system 440 may be a computing device (or collection of computing devices) separate from computing device(s) performing operations of the IMS-CSCF 420 and/or of the IMS-HSS 430, or may be a computing device (or collection of computing devices) that also performs operations of the IMS-CSCF 420 and/or of the IMS-HSS 430.

In step S403, the user device 410 may send a registration request message to the IMS-CSCF 420. The registration request message may be a MAC-based registration request message that indicates the request is from a user device having a MAC-based ID that comprises the MAC address "MAC" and the domain name "homedomain.com." The registration request message may also include an expire header and its value. For example, the registration request message in S403 in FIG. 4 may include the expire header "expires" and its value "3600." The value "3600" may indicate that the registration request will timeout in a certain time period (e.g., one hour). If the expiration occurs, the registration status of the user device 410 may become invalid. The IMS-CSCF 420 may receive the registration request message and may determine whether the registration request message includes a port number or other types of port information. If the registration request message does not include a port number or other types of port information, the IMS-CSCF 420 may determine, based on the lack of port information, that the registration request is for all available ports of the user device 410.

In step S405, the IMS-CSCF 420 may send a user-authorization-request (UAR) message to the IMS-HSS 430. The UAR message may be a DIAMETER-based message and may be sent to route a SIP registration request. In response, the IMS-HSS 430 may send a user-authorization-answer (UAA) message to the IMS-CSCF 420. The UAA message may also be a DIAMETER-based message and may indicate the result of the requested registration. In step S407, the IMS-CSCF 420 may send a multimedia-authorization-request (MAR) message to the IMS-HSS 430. The MAR message may be a DIAMETER-based message and may be sent to request authentication and authorization of a user attempt to use some SIP service. In response, the IMS-HSS 430 may send a multimedia-authorization-answer (MAA) message to the IMS-CSCF 420. The MAA message may be a DIAMETER-based message and may indicate the result of the MAR.

In step S409, the IMS-CSCF 420 may send an authentication challenge message that includes a SIP 401 response code. The authentication challenge message sent in step S409 may include an authentication challenge. In step S411, the user device 410 may send, in response to the authentication challenge message, a second registration request message that includes authentication data (e.g., an authentication token or other types of credentials to verify the user device 410). Similar to the request sent in step S403, the second registration request message may also include the MAC address of the user device 410 and the assigned domain name. If the registration request message does not include a port number or other types of port information, the IMS-CSCF 420 may determine, based on the lack of port information, that the registration request is for all available ports of the user device 410. The IMS-CSCF 420 may determine the lack of port information in both the registration request message in step S403 and the registration request message in step S411 (or may determine the lack of port information in one of the registration request messages). In step S413, the IMS-CSCF 420 may send a second UAR message to the IMS-HSS 430. In response, the IMS-HSS 430 may send a second UAA message to the IMS-CSCF 420.

If the IMS-CSCF 420 receives the authentication data from the user device 410, the IMS-CSCF 420 may authenticate the user device 410 by comparing the received authentication data with authentication data in the MAA message received from the IMS-HSS 430.

In step S417, the IMS-CSCF 420 may send a server-assignment-request (SAR) message to the IMS-HSS 430 to indicate that the user device 410 has registered. The SAR message may be a DIAMETER-based message and may be sent to indicate the completion of the authentication process and to provide the URI of a SIP server allocated to the user device 410. By sending the SAR message, the IMS-CSCF 420 may update address of record (AOR) data in IMS-HSS 430 and may retrieve IP multimedia public identities (IMPUs) and ports associated with a MAC-based ID from IMS-HSS 430. The AOR data may be a Uniform Resource Identifier (URI) with a publicly known domain that may be mapped to another URI where a user may be available. The IMPUs may respectively indicate a plurality of TNs assigned to the user device 410 and may be stored in the IMS-HSS 430 in the form of the IMS configuration data (e.g., the IMS configuration data 301). The MAC-based identity (e.g., MAC@homedomain.com) sent in the registration request message at step S403 and/or S411 may be an IMPI associated with the IMPUs. The IMS-CSCF 420 may also determine a successful authentication of the user device 410 based on the authentication data received in step S411. During a registration procedure, the SIP server may become assigned to the user device 410.

In response, the IMS-HSS 430 may send a server-assignment-answer (SAA) message to the IMS-CSCF 420. The SAA message may indicate the result of the requested assignment and may comprise the user profile. For example, the user profile may comprise all of the pubic identities associated with this user authorization (UA), identities that are associated with the private identity of the user device 410, and all of the public identities that are to be automatically (or implicitly) registered in the IMS-CSCF 420. The user profile may comprise a set of initial filter criteria (e.g., a set of conditions that a session must meet when a SIP request is forwarded to an application server for a certain service request). Contact URI of the user device 410 that the IMS-CSCF 420 stored in the IMS-HSS 430 may be the value of a Contact header from the registration request message. The IMS-CSCF 420 may store values from a Path header to determine where to route the SIP requests for that UA to.

In step S419, the IMS-CSCF 420 may send a registration response message to the user device 410. The registration response message may be a SIP-based message that comprises a SIP 200 OK response code. The registration response message may comprise a P-Associated-URI field in a header. The P-Associated-URI field may comprise a SIP URI that indicates a plurality of TNs assigned to the user device 410 and, for each TN, a port number associated with the TN. For example, the P-Associated-URI field may include SIP URIs "<sip: TN1@homedomain.com;port=1>, <sip: TN2@homedomain.com;port=2>, . . . <sip: TNn@homedomain.com;port=n>". Each of the plurality of SIP URIs may include an assigned telephone number (TN1, TN2, . . . TNn), the domain name (homedomain.com), and an associated port number (port=1, port=2, . . . port=n). Based on the received SIP URIs, the user device may store the TNs and the port number information. In step S421, the user device 410 may determine that the MAC-based registration has been completed.

Figure 5:
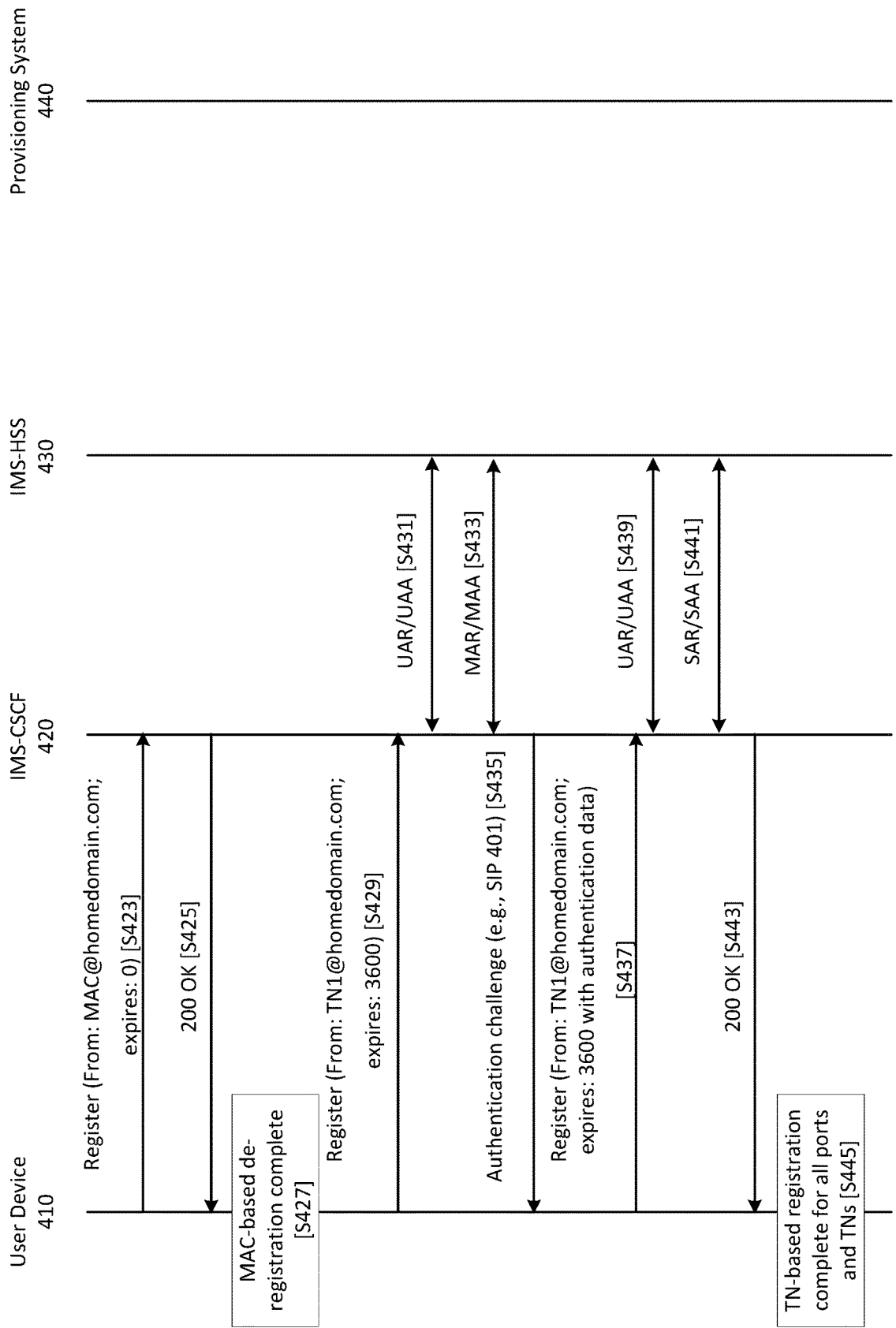
FIG. 5 is a message flow chart showing an example method for performing a MAC-based deregistration and a TN-based registration for a user device.

FIG. 5 is a message flow chart showing an example method for performing a MAC-based deregistration and a TN-based registration for a user device 410. The steps shown in FIG. 5 may be performed based on the completion of the MAC-based registration shown in FIG. 4. In step S423, the user device 410 may send a deregistration request message to the IMS-CSCF 420. The deregistration request message may be a MAC-based deregistration request message that comprises a MAC-based ID that comprises the MAC address "MAC" and the domain name "homedomain.com." An expiration value of an expiration parameter may indicate that the message requests MAC-based deregistration. For example, an expiration parameter may have value "0" as shown in step S423 of FIG. 5. The IMS-CSCF 420 may send, in step S425, a registration response message to the user device 410. In step S427, and based on the received registration response message, the user device 410 may determine that the MAC-based deregistration has been completed.

Based on the MAC-based deregistration, the user device 410 may start a TN-based registration process. In step S429, the user device 410 may send a first TN-based registration request message to the IMS-CSCF 420. The first TN-based registration request message may comprise one of the TNs previously received from the IMS-CSCF 420 (step S419) and the domain name of the host. For example, the TN-based registration request message may include "TN1@homedomain.com." The IMS-CSCF 420 may send, in step S431, a UAR to the IMS-HSS 430. The UAR may be sent from an I-CSCF of the IMS-CSCF 420 in order to receive an address of an S-CSCF associated with at least one of the TNs assigned for the user device 410. In response, the IMS-HSS 430 may send a UAA to the IMS-CSCF 420. The UAA may include the address of the S-CSCF and may be sent to the I-CSCF of the IMS-CSCF 420.

In step S433, the IMS-CSCF 420 may send an MAR to the IMS-HSS 430. The MAR may be sent from the S-CSCF and may request authentication of the user device 410. In response, the IMS-HSS 430 may send an MAA to the IMS-CSCF 420. The MAA may be sent to the S-CSCF and may include authentication challenge data. Based on the authentication challenge data, the IMS-CSCF 420 may send, in step S435, an authentication challenge message to the user device 410. For example, the authentication challenge message may be a message comprising an authentication challenge. The authentication challenge message may be sent from the S-CSCF to the I-CSCF. The I-CSCF may send the authentication challenge message to the P-CSCF, and the P-CSCF may send the authentication challenge message to the user device 410. In each message flow of the authentication challenge message, one or more encoding, encrypting or other formatting of the SIP 401 may be performed.

In step S437, the user device 410 may send a second TN-based registration request message to the IMS-CSCF 420. The second TN-based registration request message may include one of the TNs of the first TN-based registration request message (e.g., TN1). The second TN-based registration request message may also include the domain name of the host of the IMS service (or an IP address of the host) and authentication data. For example, authentication data may be included in an authorization header of a registration request message and/or another authentication field (e.g., digest authentication response field). Based on the authentication data received from the user device 410 and authentication data retrieved from the IMS-HSS 430, the IMS-CSCF 420 may successfully perform the authentication process. The first TN-based registration request message (step S429) and the second TN-based registration request message (step S437) may be distinguished based on different values in a header (e.g., From header).

In step S439, the IMS-CSCF 420 may send a UAR message to the IMS-HSS 430. The UAR message may be a DIAMETER-based message and may be sent to route a SIP register request. In response, the IMS-HSS 430 may send a UAA message to the IMS-CSCF 420. The UAA message may indicate the name of the S-CSCF assigned to the user device 410. In step S441, the IMS-CSCF 420 may send an SAR message to the IMS-HSS 430. In response, the IMS-HSS 430 may send an SAA message to the IMS-CSCF 420.

In step S443, the IMS-CSCF 420 may send a registration response message to the user device 410 indicating (e.g., by comprising a 200 OK code) successful registration. The registration response message may comprise an indication that the TN-based registration for TN1 and other TNs assigned to the user device 410 have been completed. In step S445, the user device 410 may determine that the TN-based registration for all of the TNs assigned to the user device 410 have been completed. For example, although the user device 410 may not send TN2, TN3, . . . , and TNn in a TN-based registration request message, implicit registrations for TN2, TN3, . . . , and TNn may also be completed. The first TN-based registration request message (step S429) and/or the second TN-based registration request message (step S437) may indicate to the IMS-CSCF 420 the implicit registration requests for the remaining TNs (e.g., TN2, TN3, . . . , and TNn) associated with the IMS configuration data for the user device 410. For example, as shown in FIG. 5, the first TN-based registration request message in step S429 and the second TN-based registration request message in step S437 do not include port information. The omission of the port information may indicate that the user device 410 requests implicit registrations for other TNs including TN2, TN3, . . . , and TNn. Alternatively or additionally, a message from the user device 410 or a message from the IMS-CSCF 420 may include a field that indicates the implicit registrations for other TNs.

The processes described above with respect to FIGS. 4 and 5 may reduce a significant quantity of message communications among the user device 410, IMS-CSCF 420, and IMS-HSS 430. For example, if a MAC-based registration for a single port is performed, a single TN-based registration may be performed based on deregistering the MAC-based registration. Based on the single TN-based registration, another MAC-based registration and another MAC-based deregistration may need to be performed to initiate another TN-based registration for a different port associated with a different TN. However, the processes described above enable a single MAC-based registration process and a single TN-based registration for multiple ports. For provisioning and registration for tens of millions of user devices, the processes described with respect to FIGS. 4 and 5 may provide an efficient and fast service.

Figure 6A:
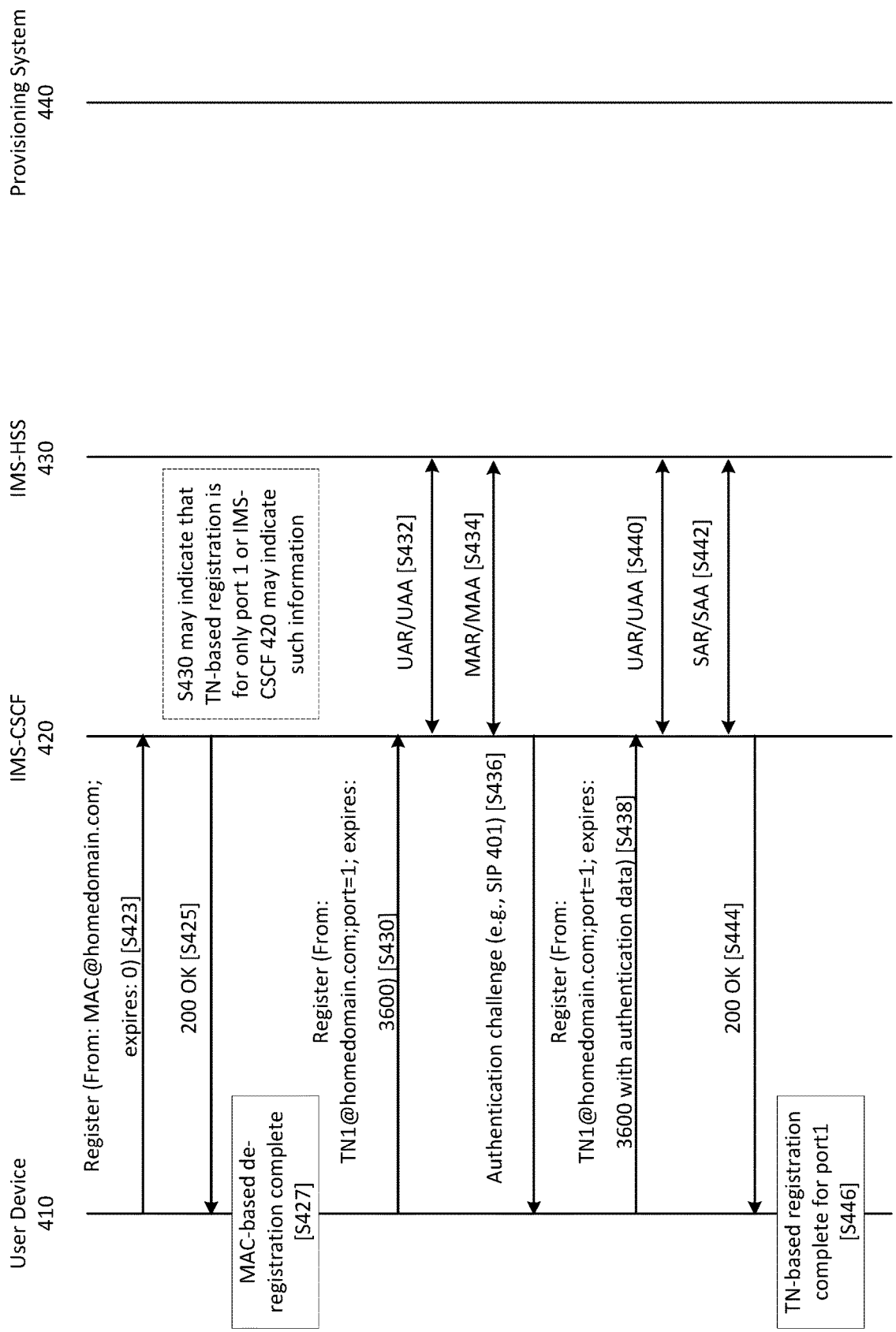
FIGS. 6A and 6B are message flow charts showing an example method for performing a MAC-based deregistration and a TN-based registration of multiple telephone numbers for a multiport user device.
Figure 6B:
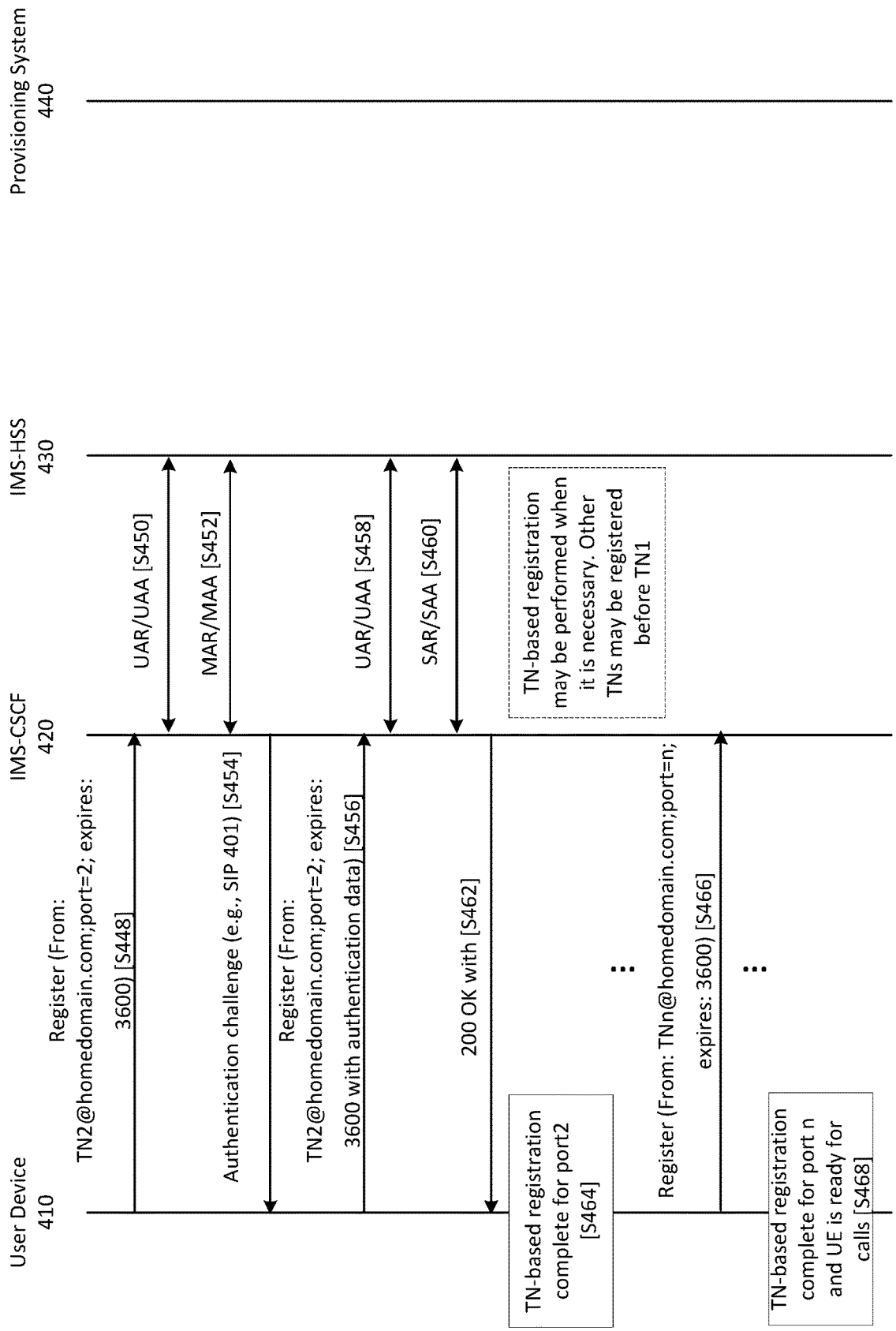

FIGS. 6A and 6B are message flow charts showing another example method for performing a MAC-based deregistration and a TN-based registration of multiple telephone numbers for a multi-port user device. The steps shown in FIG. 6A may be performed based on the completion of the MAC-based registration shown in FIG. 4. The steps S423, S425, and S427 in FIG. 6A may respectively be the same or similar to the steps S423, S425, and S427 in FIG. 5.

Step S430, S432, S434, S436, S438, S440, S442, S444, and S446 shown in FIG. 6A are similar to steps S429, S431, S433, S435, S437, S439, S441, S443, and S445 shown in FIG. 5, except that steps S430, S432, S434, S436, S438, S440, S442, S444, and S446 shown in FIG. 6A request only TN1 registration. Unlike steps S429 and S437, the user device 410, in steps S430 and S438, may send a registration request message that comprises a TN (TN1), a domain name (homedomain.com), port parameter (port), and port number (1). The port information (port=1) in the registration request message sent in steps S430 and S438 may indicate that the TN-based registration is only for the TN1 associated with the port number 1.

FIG. 6B is a message flow chart showing an example method for performing TN-based registrations of TN2 through TNn for a user device 410. The steps shown in FIG. 6B may be performed after step S446 of FIG. 6A. Step S448, S450, S452, S454, S456, S458, S460, S462, and S464 shown in FIG. 6B may be similar to steps S430, S432, S434, S436, S438, S440, S442, S444, and S446 shown in FIG. 6A except that steps S448, S450, S452, S454, S456, S458, S460, S462, and S464 shown in FIG. 6B request TN2 registration. Additional TN-based registrations for TN3, . . . , and TNn may be performed by performance, for each of TN3 through TNn, of a series of operations similar to those performed for TN2 registration. In step S468, the user device 410 may determine that the TN-based registrations for TN1 through TNn have been completed. The registration order of the TNs may be changed. Some of the TNs including TN1 may not require an immediate registration. For example, TN2 may be registered without registering TN1 or before registering TN1.

Although the TN-based registrations described with respect to FIGS. 6A and 6B communicate more messages than the processes described above with respect to FIG. 5, The TN-based registrations described with respect to FIGS. 6A and 6B may not require multiple MAC-based registrations or multiple MAC-based deregistrations. For a single MAC-based registration for a plurality of ports and a single MAC-based deregistration, one or more TN-based registrations may be performed for a subset of TNs assigned to the user device 410. For example, only TN2 and TN3 may be registered without registering TN1.

Operations such as those described in connection with FIGS. 4-6B may be performed in connection with user data such as the user data 302 of FIG. 3D. For example, a user may subscribe for a service provided by a service provider and receive a user ID (e.g., userB). The service provider may create a user profile and register two user devices having MAC addresses, MAC_a and MAC_b, respectively. A provisioning system, e.g., the provisioning system 440, may generate an IMS configuration for the user (e.g., the IMS configuration for user B 302). FIG. 3D shows, in an example, that the user device having the mac address of MAC_a supports 4 ports and is assigned 4 TNs and that the user device having the mac address of MAC_b supports 2 ports and is assigned 2 TNs. The IMS configuration may comprise a private ID "userB@homedomain.com." The IMS configuration may comprise two MAC-based IDs "MAC_a@homedomain.com" and "MAC_b@homedomain.com." Each of the two MAC-based IDs may be associated with a corresponding one of the two user devices. For the registration of the user device having the mac address of MAC_a, the MAC-based ID of MAC_a@homedomain.com may be sent to the CSCF 420 in step S403, in step S411, and in step S423. For the registration of the user device having the mac address of MAC_b, the MAC-based ID of MAC_b@homedomain.com may be sent to the CSCF 420 in step S403, in step S411, and in step S423. Other operations of FIGS. 4-6B may be performed for the two user devices in a manner similar to that described in FIGS. 4-6B, but using appropriate data from user data 302.

Figure 7A:
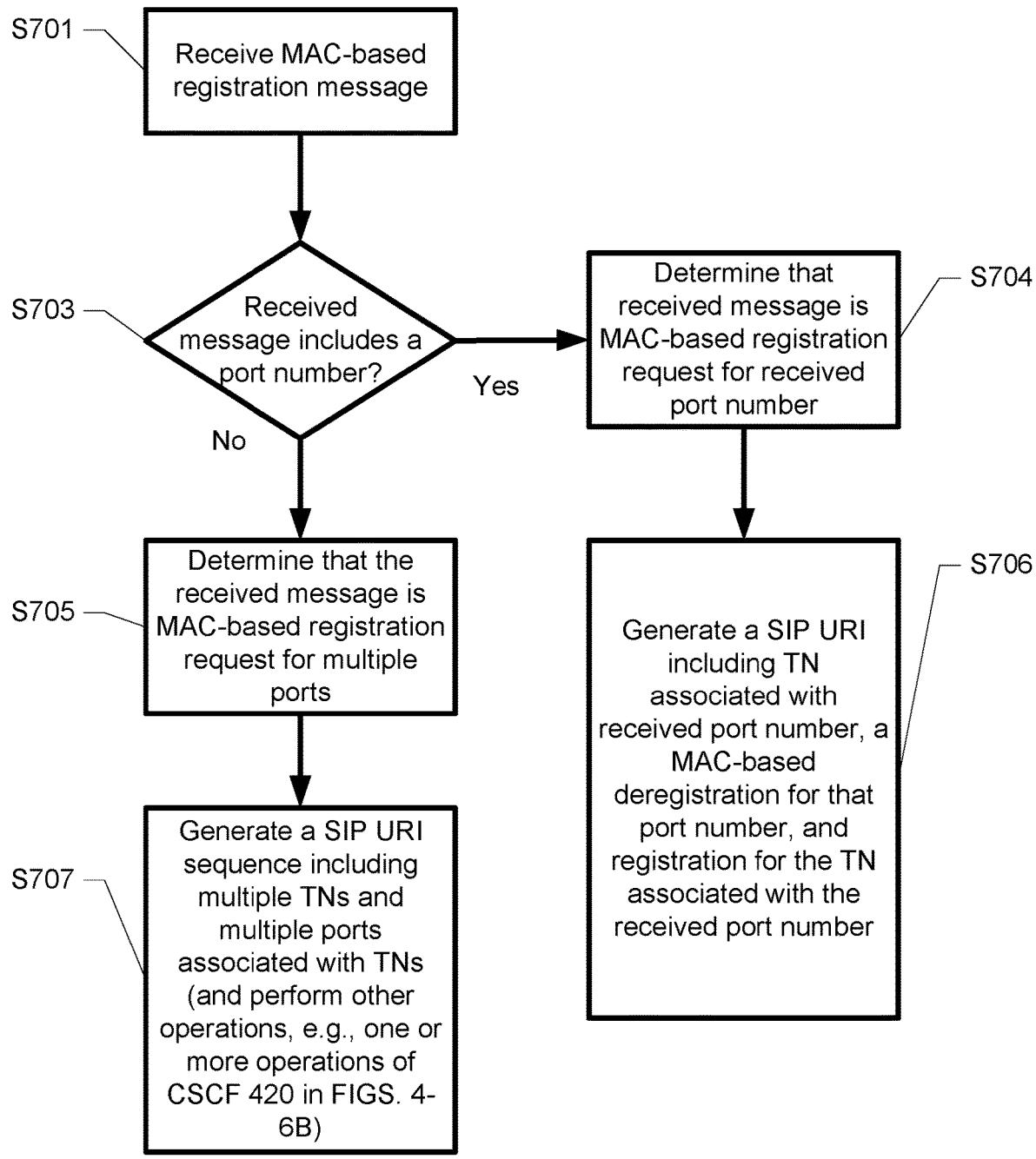
FIG. 7A is a flow chart showing an example method for performing a MAC-based registration for a user device.

FIG. 7A is a flow chart showing an example method for performing a MAC-based registration for a user device. The method of FIG. 7A may be performed by a computing device of a network (e.g., the IMS-CSCF 420).

In step S701, the computing device may receive a MAC-based registration request message. In step S703, the computing device may determine whether the registration request message includes a port number or other types of port information. If the registration request message does not include a port number or other types of port information, the computing device may determine, in step S705 and based on the omission of the port number, that the registration request is a MAC-based registration request for multiple ports, and that operations such as those described in connection with FIGS. 4-6B should be performed. In step S707, the computing device may generate a SIP URI sequence including multiple TNs and multiple ports associated with the TNs. For example, the computing device may generate a sequence of SIP URIs (<sip:TN1@homedomain.com; port=1>, . . . , <sip:TNn@homedomain.com;port=n>) shown in step S419 of FIG. 4. The computing device may also perform other operations such as those described for IMS-CSCF 420 in FIGS. 4-6B.

The computing device performing the operations of FIG. 7A may be configured to also accommodate registration of multi-port user devices that do not support registration as described in connection with FIGS. 4-6B. Such a user device may send a MAC-based registration request message including MAC ID, a port number, and a domain name. For example, the user device may send, to the IMS-CSCF 420, "MAC01@homedomain.com", "MAC@homedomain.com;port=1", or "MAC@homedomain.com:3001" (assuming port 3001 corresponds to port number=1). If the received MAC-based registration request message includes a port number or other types of port information, the computing device may determine, in step S704 and based on the presence of the port information, that the received request message is a MAC-based registration request for the received port number. For example, the IMS-CSCF 420 may parse the received request and determine that the user device has requested a MAC-based registration for port number 1 because the received request includes information of the port number 1. In step S706, the computing device may generate a SIP URI including the received port number and TN associated with the received port number. The computing device may perform, in step S706, a MAC-based registration for the received port number, a MAC-based deregistration for that port number, and registration for the TN associated with the received port number.

In order to enable a registration for a user device using an identity comprising a MAC combined with a port number (e.g., MAC01@homedomain.com), a computing device (e.g., the provisioning system 440) may add, during user provisioning, an additional identity to the user profile in an HSS (e.g., the IMS-HSS 430). For example, the user profile may include the following:

```
<PublicIdentity>
    <BarringIndication> 1 </BarringIndication>
    <Identity> sip:MAC01@homedomain.com </Identity>
</PublicIdentity>
```

The presence of the barring indication information (<BarringIndication> 1 </BarringIndication>) may indicate the user having the identity, MAC01@homedomain.com, cannot make calls because the Boolean-type value of the barring indication information is set to "1." The barred identity "sip:MAC01@homedomain.com" that indicates the port number 1 is associated with the barred identity because it includes "01." To enable making calls via one or more TNs associated with the port number 1, a subsequent TN-based registration may be performed with the one or more TNs associated with the port number 1. If the user device sends the identity comprising a MAC combined with a port number, the HSS may interrupt an implicit registration of all the TNs. Instead, the HSS may respond back with one or more TNs associated with that MAC and port number included in the identity. For example, if MAC01@homedomain.com is received from the user device, one or more TNs associated with the port number 1 may be determined from the user profile of the user. As a response to the registration request including MAC01@homedomain.com, the user device may receive one or more TNs but not the port number 1. TNs for other port numbers may not be registered. If the user device sends a registration for another port (e.g., MAC02@homedomain.com), the HSS may implicitly register one or more TNs associated with that MAC and port number 2. With respect to each port number, the user device may deregister a MAC-based registration and perform a TN-based registration for that port number.

FIG. 7B shows an example of IMS configuration data 701 for a user that may be stored by an IMS-HSS and/or by other elements described herein, and that may be provided to an IMS-CSCF. The IMS configuration for a user may include a private identity and a plurality of public identities associated with the private identity. The private identity may be a MAC-based ID that is based on a MAC address associated with a user. An example private identity for the user device may be a MAC-based private identity (e.g., MAC@homedomain.com) that includes a MAC address of the user device "MAC" and an assigned domain name "homedomain.com". The private identity may be differently set (e.g., user@homedomain.com).

The IMS configuration data 701 for the user may also include data indicating a plurality of public identities associated with the private identity. For example, three MAC-based public identities "sip:MAC@homedomain.com", "sip:MAC01@homedomain.com", and "sip:MAC02@homedomain.com" may be included if the user device supports two ports. The three MAC-based public identities may be barred from any communication other than registration and de-registration by setting the corresponding BarringIndicator value to 1. By having the three barred MAC-based public identities, the IMS-CSCF and the IMS-HSS may recognize three MAC-based registration requests (each including "sip:MAC@homedomain.com", "sip:MAC01 @homedomain.com", or "sip:MAC02@homedomain.com") that may be sent from a user device. If the IMS-CSCF receives sip:MAC@homedomain.com, the processes described above with respect to FIGS. 4-5 or the processes described above with respect to FIGS. 4, 6A, and 6B may be performed. One or more TNs may have public identities in both a SIP format and a TEL format. For example, for TN1, a SIP format public identity "sip:TN1@homedomain.com" and a TEL format public identity "tel:TN1" are defined in the IMS configuration data 701. When a TN-based registration for the TN1 is performed, both "sip:TN1@homedomain.com" and "tel:TN1" may be implicitly registered.

If the IMS-CSCF receives a MAC-based registration request including the MAC and port number format (e.g., "MAC01@homedomain.com" or "MAC02@homedomain.com"), the IMS-CSCF and the IMS-HSS may not implicitly register all TNs associated with the user device. Instead, the IMS-CSCF and the IMS-HSS may only register one or more TNs associated with the port number included in the MAC-based registration request. For example, if the user device sends "MAC01@homedomain.com" as a MAC-based registration, the IMS-CSCF may send to the user device "sip: TN1@homedomain.com" and "tel:TN1" without sending the port number information (the IMS-CSCF may not send "port=1"). The user device may perform a MAC-based deregistration and perform a TN-based registration for TN1.

If the user device sends "MAC02@homedomain.com" as a MAC-based registration, the IMS-CSCF may send to the user device "sip:TN2@homedomain.com" and "tel:TN2" without sending the port number information (the IMS-CSCF may not send "port=2"). The user device may perform a MAC-based deregistration and perform a TN-based registration for TN2.

FIG. 8 shows example SIP URI options for one or more users. In an option 1, a user may subscribe for a network service and may indicate two user devices to be registered under the user. The user may apply for three TNs for the network service. Based on the MAC-based registration process described above, the user may register a first user device having a MAC-based identity "MAC_A@homedomain.com" and a second user device having a MAC-based identity "MAC_B@homedomain.com." The first user device may have two ports and may be assigned two TN-based public identities "sip: TN1@homedomain.com;port=1" and "sip: TN2@homedomain.com;port=2." The second user device may have one port and may be assigned one TN-based public identity without a port number.

In option 2, a user may subscribe for a network service and may indicate one user device to be registered under the user. The user may apply for three TNs for the network service. Based on the MAC-based registration process described above, the user may register a user device having a MAC-based identity "MAC@homedomain.com." The user device may have four ports and may be assigned with three TN-based public identities "sip: TN4@homedomain.com:3001", "sip: TN5@homedomain.com:3002", and "sip: TN6@homedomain.com:3003." The fourth port of the user device may not be assigned with a TN-based public identity.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. An apparatus comprising:
one or more processors; and
memory storing instructions that, when executed by the one or more processors, cause the apparatus to:
receive, from a user device, a first message comprising a private identifier associated with the user device;
determine, based on the private identifier, a plurality of public identifiers and a plurality of ports, of the user device, associated with the public identifiers; and
send, to the user device and based on the first message not comprising an indication of a port of the plurality of ports, a second message comprising the plurality of public identifiers and information indicating the plurality of ports.

2. The apparatus of claim 1, wherein the first message comprises a Session Initiation Protocol (SIP) message comprising the private identifier in a user part of the first message and a host address, associated with the apparatus, in a host part of the first message.

3. The apparatus of claim 1, wherein the private identifier comprises a Media Access Control (MAC) address of the user device.

4. The apparatus of claim 3, wherein the public identifiers comprise telephone numbers, and wherein the instructions, when executed by the one or more processors, cause the apparatus to:
receive, after sending the second message and from the user device, a MAC deregistration message; and
receive, after receiving the MAC deregistration message, one or more registration messages for the telephone numbers.

5. The apparatus of claim 1, wherein the instructions, when executed by the one or more processors, cause the apparatus to determine the plurality of public identifiers by determining, based on a Session Initiation Protocol and based on provisioning information provided by a provisioning device, the public identifiers for the user device.

6. The apparatus of claim 1, wherein the public identifiers comprise telephone numbers, wherein the telephone numbers and the ports that are associated with the telephone numbers are associated with the private identifier, and wherein the private identifier is associated with an IP Multimedia Subsystem (IMS) subscription.

7. The apparatus of claim 1, wherein the plurality of public identifiers comprise telephone numbers, and wherein the instructions, when executed by the one or more processors, cause the apparatus to:
receive, from the user device, a third message comprising a subset of the telephone numbers; and
register, based on the third message, the telephone numbers.

8. The apparatus of claim 1, wherein the instructions, when executed by the one or more processors, cause the apparatus to determine the plurality of ports by receiving, from one or more computing devices different from the apparatus, indications of the plurality of ports.

9. One or more non-transitory computer-readable media storing instructions that, when executed, cause:
receiving, from a user device, a first message comprising a private identifier associated with the user device;
determining, based on the private identifier, a plurality of public identifiers and a plurality of ports, of the user device, associated with the public identifiers; and
sending, to the user device and based on the first message not comprising an indication of a port of the plurality of ports, a second message comprising the plurality of public identifiers and information indicating the plurality of ports.

10. The one or more non-transitory computer-readable media of claim 9, wherein the first message comprises a Session Initiation Protocol (SIP) message comprising the private identifier in a user part of the first message and a host address in a host part of the first message.

11. The one or more non-transitory computer-readable media of claim 9, wherein the private identifier comprises a Media Access Control (MAC) address of the user device.

12. The one or more non-transitory computer-readable media of claim 11, wherein the plurality of public identifiers comprise telephone numbers, and wherein the instructions, when executed, cause:
receiving, after sending the second message and from the user device, a MAC deregistration message; and
receiving, after receiving the MAC deregistration message, one or more registration messages for the telephone numbers.

13. The one or more non-transitory computer-readable media of claim 9, wherein the instructions, when executed, cause the determining the plurality of public identifiers by causing determining, based on a Session Initiation Protocol and based on provisioning information provided by a provisioning device, the public identifiers for the user device.

14. The one or more non-transitory computer-readable media of claim 9, wherein the public identifiers comprise telephone numbers, wherein the telephone numbers and the ports that are associated with the telephone numbers are associated with the private identifier, and wherein the private identifier is associated with an IP Multimedia Subsystem (IMS) subscription.

15. The one or more non-transitory computer-readable media of claim 9, wherein the plurality of public identifiers comprise telephone numbers, and wherein the instructions, when executed, cause:
receiving, from the user device, a third message comprising a subset of the telephone numbers; and
registering, based on the third message, the telephone numbers.

16. The one or more non-transitory computer-readable media of claim 9, wherein the instructions, when executed, cause the determining the plurality of ports by causing receiving, by a computing device and from one or more computing devices different from the computing device, indications of the plurality of ports.

17. A system comprising:
a user device; and
a computing device comprising:
one or more first processors; and
memory storing first instructions that, when executed by the one or more first processors, cause the computing device to:
receive, from the user device, a first message comprising a private identifier associated with the user device;
determine, based on the private identifier, a plurality of public identifiers and a plurality of ports, of the user device, associated with the public identifiers; and
send, to the user device and based on the first message not comprising an indication of a port of the plurality of ports, a second message comprising the plurality of public identifiers and information indicating the plurality of ports; and
wherein the user device comprises:
one or more second processors; and
memory storing second instructions that, when executed by the one or more second processors, cause the user device to send the first message.

18. The system of claim 17, wherein the first message comprises a Session Initiation Protocol (SIP) message comprising the private identifier in a user part of the first message and a host address, associated with the computing device, in a host part of the first message.

19. The system of claim 17, wherein the private identifier comprises a Media Access Control (MAC) address of the user device.

20. The system of claim 19, wherein the plurality of public identifiers comprise telephone numbers, and wherein the first instructions, when executed by the one or more first processors, cause the computing device to:
receive, after sending the second message and from the user device, a MAC deregistration message; and
receive, after receiving the MAC deregistration message, one or more registration messages for the telephone numbers.

21. The system of claim 17, wherein the first instructions, when executed by the one or more first processors, cause the computing device to determine the plurality of public identifiers by determining, based on a Session Initiation Protocol and based on provisioning information provided by a provisioning device, the public identifiers for the user device.

22. The system of claim 17, wherein the public identifiers comprise telephone numbers, wherein the telephone numbers and the ports that are associated with the telephone numbers are associated with the private identifier, and wherein the private identifier is associated with an IP Multimedia Subsystem (IMS) subscription.

23. The system of claim 17, wherein the plurality of public identifiers comprise telephone numbers, and wherein the first instructions, when executed by the one or more first processors, cause the computing device to:
receive, from the user device, a third message comprising a subset of the telephone numbers; and
register, based on the third message, the telephone numbers.

24. The system of claim 17, wherein the first instructions, when executed by the one or more first processors, cause the computing device to determine the plurality of ports by receiving, from one or more computing devices different from the computing device, indications of the plurality of ports.

25. An apparatus comprising:
one or more processors;
a plurality of ports; and
memory storing instructions that, when executed by the one or more processors, cause the apparatus to:
send, to a computing device, a first message comprising a private identifier associated with the apparatus, wherein the first message does not indicate any of the plurality of ports;
receive, from the computing device and based on an absence of indication of ports in the first message, a second message indicating a plurality of public identifiers and the plurality of ports; and
register, based on the plurality of public identifiers and the plurality of ports, the apparatus.

26. The apparatus of claim 25, wherein the first message comprises a Session Initiation Protocol (SIP) message comprising the private identifier in a user part of the first message and a host address, associated with the computing device, in a host part of the first message.

27. The apparatus of claim 25, wherein the private identifier comprises a Media Access Control (MAC) address of the apparatus.

28. The apparatus of claim 27, wherein the plurality of public identifiers comprise telephone numbers, and wherein the instructions, when executed by the one or more processors, cause the apparatus to:
send, after receiving the second message and to the computing device, a MAC deregistration message; and
send, after sending the MAC deregistration message, one or more registration messages for the telephone numbers.

29. The apparatus of claim 25, wherein the public identifiers comprise telephone numbers, wherein the telephone numbers and the ports are associated with the private identifier, and wherein the private identifier is associated with an IP Multimedia Subsystem (IMS) subscription.

30. The apparatus of claim 25, wherein the plurality of public identifiers comprise telephone numbers, and wherein the instructions, when executed by the one or more processors, cause the apparatus to:
send, to the computing device, a third message comprising a subset of the telephone numbers; and
determine, based on an acknowledgement of the third message, that registrations for the telephone numbers have been completed.

31. The apparatus of claim 25, wherein the second message indicates respective associations of the plurality of public identifiers and the plurality of ports.

32. One or more non-transitory computer-readable media storing instructions that, when executed, cause:
sending, to a computing device, a first message comprising a private identifier associated with a user device comprising a plurality of ports, wherein the first message does not indicate any of the plurality of ports;
receiving, from the computing device and based on an absence of indication of ports in the first message, a second message indicating a plurality of public identifiers and the plurality of ports; and
registering, based on the plurality of public identifiers and the plurality of ports, the user device.

33. The one or more non-transitory computer-readable media of claim 32, wherein the first message comprises a Session Initiation Protocol (SIP) message comprising the private identifier in a user part of the first message and a host address, associated with the computing device, in a host part of the first message.

34. The one or more non-transitory computer-readable media of claim 32, wherein the private identifier comprises a Media Access Control (MAC) address of the user device.

35. The one or more non-transitory computer-readable media of claim 34, wherein the plurality of public identifiers comprise telephone numbers, and wherein the instructions, when executed, cause:
sending, after receiving the second message, a MAC deregistration message; and
sending, after sending the MAC deregistration message, one or more registration messages for the telephone numbers.

36. The one or more non-transitory computer-readable media of claim 32, wherein the public identifiers comprise telephone numbers, wherein the telephone numbers and the ports are associated with the private identifier, and wherein the private identifier is associated with an IP Multimedia Subsystem (IMS) subscription.

37. The one or more non-transitory computer-readable media of claim 32, wherein the plurality of public identifiers comprise telephone numbers, and wherein the instructions, when executed, cause:
sending, to the computing device, a third message comprising a subset of the telephone numbers; and
determining, based on an acknowledgement of the third message, that registrations for the telephone numbers have been completed.

38. The one or more non-transitory computer-readable media of claim 32, wherein the second message indicates respective associations of the plurality of public identifiers and the plurality of ports.

* * * * *